May 12, 1959

E. T. YOUNG 2,885,785

ENGRAVING APPARATUS

Filed May 28, 1954

INVENTOR.
EINAR T. YOUNG
BY
ATTORNEYS

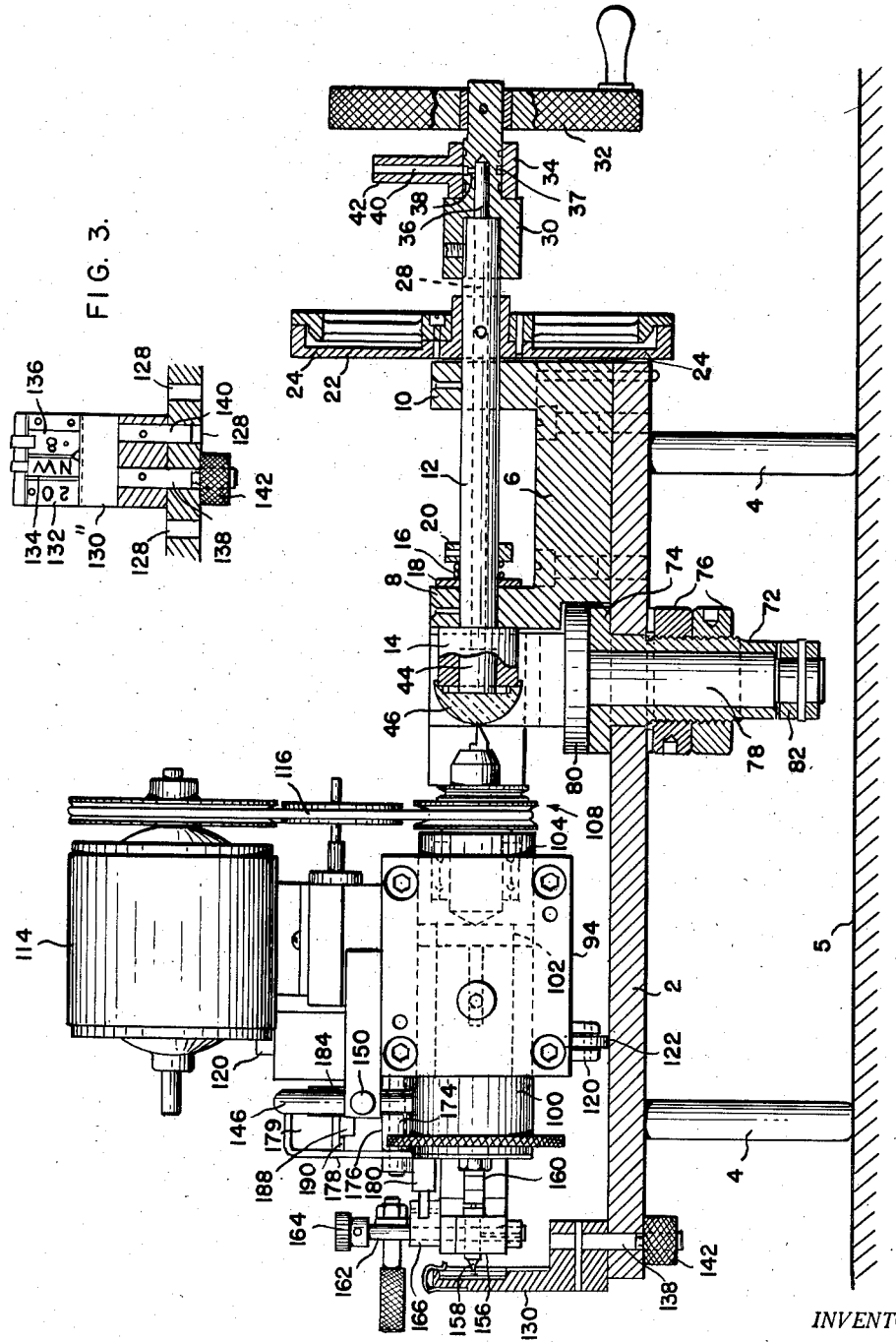

*INVENTOR.*
EINAR T. YOUNG
BY
ATTORNEYS

INVENTOR.
EINAR T. YOUNG
BY
ATTORNEYS

United States Patent Office 2,885,785
Patented May 12, 1959

2,885,785

ENGRAVING APPARATUS

Einar T. Young, Newtown Square, Pa., assignor to Sun Oil Company, Philadelphia, Pa., a corporation of New Jersey Application May 28, 1954, Serial No. 433,087

6 Claims. (Cl. 33—21)

This invention relates to engraving apparatus and, more particularly, to apparatus for engraving latitude and longitude lines and other specifically located indicia on a hemisphere.

In the process of drilling a bore hole it is necessary at intervals to run instruments down into the hole in order to determine the deviation of the hole from vertical or from a desired drilling direction. Among the instruments employed for this purpose are instruments which include a compass arrangement having an element in the form of a hemisphere positioned by the compass and then photographed, generally with regard to other indicating means, to provide an indication of the inclination of the bore hole and the direction of that inclination. The hemisphere of such a compass arrangement is marked with latitude and longitude lines and with compass bearing indicia. These lines and indicia provide means which, in conjunction with the other indications photographed, provide the necessary information with regard to the inclination of the bore hole. Inasmuch as these photographic records are of relatively small size, it will be evident that the indicia markings on the hemisphere must be extremely accurately engraved in order that the resulting record may be accurately measured in order to provide accurate indications of inclination and direction.

It is the object of this invention to provide apparatus whereby a hemisphere may be conveniently and accurately engraved with latitude and longitude lines and with compass bearing indicia.

More specifically, it is among the objects of the invention to provide a motor driven rotating engraving cutter which is selectively movable with respect to a rotatable hemisphere to be engraved so as to cut latitude or longitude lines in the hemisphere and which is movable in response to a stylus moving over master engraved plates to engrave indicia on the hemisphere.

These and subsidiary objects of the invention will become apparent from the following description when read in conjunction with the accompanying drawings, in which:

Figure 2 is an elevation of the apparatus partly in section;

Figure 3 is an elevation of a fragmentary portion of the apparatus indicated by the trace 3—3 in Figure 1;

Figures 1, 4:
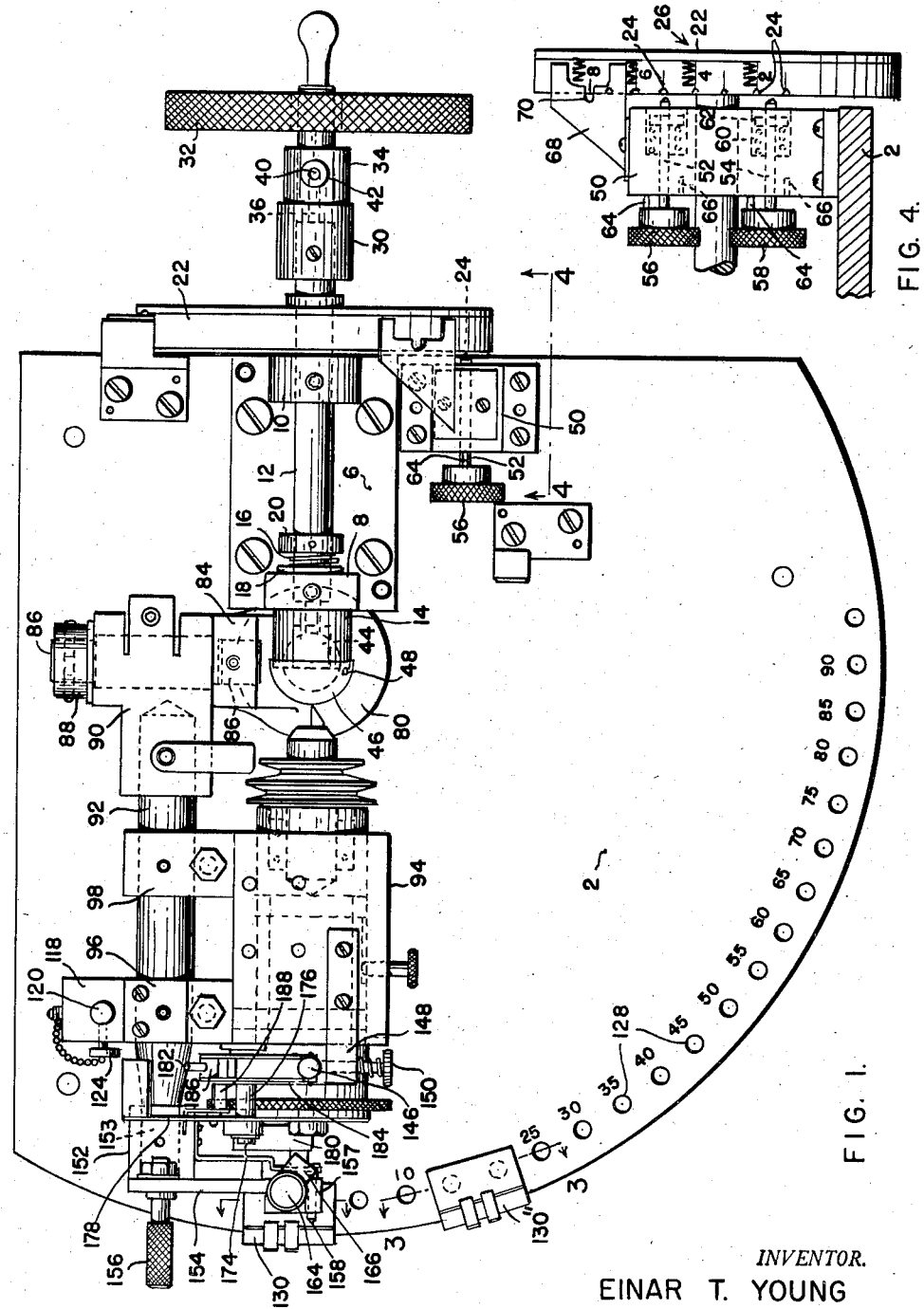
Figure 1 is a plan view of the apparatus with the driving motor removed.
Figure 4 is an elevation of a fragmentary portion of the apparatus indicated by the trace 4—4 in Figure 1.

Referring to the drawings, the apparatus is mounted on a bed plate 2 which is supported by legs 4 from any convenient supporting surface 5. A block 6 is affixed to the plate 2 and is provided with two upwardly extending members 8 and 10. A shaft 12 extends through and is rotatably mounted in the extensions 8 and 10. The left-hand end of the shaft 12 is provided with an enlarged portion 14 which is adapted to engage the left-hand surface of the upward member 8 as viewed in Figure 2. A spring 16 mounted between a bearing washer 18 and a collar 20 which is attached to the shaft 12 is adapted to urge the shaft 12 to the right, as viewed in Figure 2, and maintain the right-hand surface of the enlarged portion 14 of the shaft in engagement with the left-hand face of the member 8. A disc 22 is affixed to the shaft 12 and carries on its left-hand face an annular array of tapered bores 24. The peripheral surface of the disc 22 is graduated with compass bearings, as indicated at 26 in Figure 4. The bores 24 are positioned at 10° intervals around the disc.

The shaft 12 is provided with a longitudinally extending bore 28. A fitting 30 is affixed to the right-hand end of the shaft 12, as viewed in Figure 2, and mounts a hand wheel 32 by means of which the shaft 12 may be manually rotated. A swivel fitting 34 is mounted on the fitting 30. The fitting 30 is provided with an axially extending bore 36 and an annular groove 37 joined by a radially extending bore 38 by means of which connection is maintained between the bore 28 in the shaft 12 and a central bore 40 in a stem extension 42 of the fitting 30.

The enlarged left-hand end portion 14 of the shaft 12 is provided with an enlarged bore 44 which communicates with the bore 28 in the shaft 12. The left-hand end face of the portion 14 is adapted to receive a hemisphere 46 which is to be engraved. The hemisphere is provided with a recess adapted to receive a pin 48 affixed to the portion 14 of the shaft in order to index the hemisphere. The stem 42 is adapted to receive a flexible hose line connected to a suitable vacuum pump whereby a vacuum is maintained within the bore 44 serving to hold the hemisphere 46 snugly in engagement with the enlarged end 14 of the shaft 12.

A mounting block 50 is attached to the base plate 2 and contains bores slidably mounting a pair of horizontally extending pins 52 and 54. The pins 52 and 54 are provided at their left-hand ends with knurled heads 56 and 58. Each of the pins is urged to the right, as viewed in Figure 4, by an arrangement consisting of a spring 60 acting between the shoulder of a recess in the block 50 and a collar 62 affixed to the pins. Each of the knurled heads 56 and 58 has a small pin 64 extending parallel to and displaced from its associated large pin 52, 54 respectively. The block 50 is provided with small bores 66 so positioned that, upon rotation of the knurled heads 56 and 58, the small pins 64 will engage the small bores 66 and permit the springs 60 to move the pins to the right as viewed in Figure 2. As previously noted, the bores 24 in the disc 22 are spaced at 10° intervals. The pins 52 and 54 are positioned so as to enter these bores but are spaced at a 35° interval. Thus, by successively entering the pins 52 and 54 into the bores 24, the disc 22 is indexed at 5° intervals. When both of the small pins 64 are in the position shown, the right-hand ends of the large pins 52 and 54 are disengaged from the disc 22 and the disc may be rotated freely by means of the hand wheel 32.

A plate 68 is affixed to the upper surface of the block 50 and is adapted to have its right-hand portion lying over the peripheral surface of the disc 22. The plate 68 is provided with a cut-out portion 70 extending over the peripheral surface of the disc 22 through which the compass indicia carried by the peripheral surface of the disc 22 may be read and the setting of the disc 22 by the pins 52 and 54 noted.

A bearing sleeve 72 extends downwardly through the bed plate 2 and has an outwardly extending flange 74 at its upper end which is held firmly in engagement with the upper surface of the bed plate 2 by means of a pair of jam nuts 76. A shaft 78 is rotatably mounted in the sleeve 72. The shaft 78 has an enlarged upper portion 80 which rests upon the flange 74 of the bearing member and is provided at its lower end with a pinned collar 82 which prevents the shaft 78 from rising in the bearing sleeve 72. The shaft 78 and the left-hand surface of the enlarged portion 14 of the shaft 12, as viewed in Figure 2, are so positioned with respect to each other that the axis of rotation of the shaft 78 passes parallel to the equatorial plane of the hemisphere 46 and pass through the center of radius of the hemisphere.

A vertically extending portion 84 of the enlarged head portion 80 of the shaft 78 mounts a horizontally extending shaft 86. This shaft is positioned at right angles to the shaft 78 and has its longitudinal center extending parallel to the equatorial plane of the hemisphere 46 and passing through the center of radius of the hemisphere. A fitting 90 is rotatably mounted on the shaft 86 between the upwardly extending portion 84 and a locking collar 88. The fitting 90 supports a horizontally extending shaft 92 positioned perpendicular to the shaft 86.

A spindle mounting block 94 is supported from the shaft 92 by means of a pair of clamping members 96 and 98 which are affixed to the block 94. A sleeve 100 is slidably mounted within a bore within the block 94 and is retained in position therein by means of a set screw 101. A spindle 102 is slidably mounted within the sleeve 100 and has an enlarged right-hand end portion 104, as viewed in Figure 2, which slides in the bore in the block 94. A shaft 106 is rotatably mounted in the enlarged portion 104 of the spindle and carries pulleys as indicated generally at 108. The shaft 106 extends through the pulleys and has at its right-hand end, as viewed in Figure 2, a mounting head 110 in which there is mounted an engraving cutter 112. The engraving cutter is rotated by means of an electric motor 114 mounted on the block 94 driving a belt 116 which passes over one of the pulleys indicated at 108.

A rearward extension 118 of the clamp member 96 carries a vertically extending member 120 which mounts at its lower end a roller 122 adapted to bear on the upper surface of the bed plate 2. The member 120 is held in a predetermined position within the extension 118 by means of a pin 124. This arrangement provides for support for the left-hand end of the engraving cutter assembly while the shaft 86 provides support for the right-hand end of the assembly. When the assembly is in the position shown, the axis of rotation of the engraving cutter extends on a line coincident with the axis of rotation of the shaft 12.

The apparatus thus far described is employed to cut latitude circles and longitude lines on the hemisphere 46. When the engraving cutter is moved into engagement with the hemisphere in the manner hereinafter described and the engraving cutter assembly is rotated around the center of shaft 78, the engraving cutter will cut longitude lines on the hemisphere. If, when the engraving assembly is moved to a position wherein the engraving cutter is displaced from the pole position of the hemisphere, the engraving assembly is held stationary and the shaft 12 is rotated rotating the hemisphere, latitude circles will be cut in the hemisphere.

The bed plate 2 is provided with an arcuate array of bores 128. The center of the arc is coincident with the center of the shaft 78. Retainers, such as 130 and 130″, adapted to retain master engraved plates, such as those shown at 132, 134 and 136 in Figure 3, are provided with downwardly extending pins 138 and 140 which are adapted to enter adjacent bores 128 and are secured to the bed plate by means of locking nuts 142 threaded onto the threaded lower portions of the pins 138. If an arcuate array of retainers 130 is positioned in the arcuate array of bores 128 and the retainers are provided with suitable master engraved plates, engravings, such as the 20NW8, 40NW8, 60NW8, etc., as shown at 204 in Figure 11, may be engraved on the NW8 longitude line of the hemisphere. This is accomplished by positioning the disc 22 in the NW8 position, as shown in Figure 4, and locking the disc in this position by means of the pin 52, and by use of a tracing stylus which is affixed to the engraving head and is adapted to engage the master engraving plates.

The apparatus providing the stylus and the apparatus moving the engraving cutter into and out of engagement with the hemisphere will now be described. The sleeve 100 is provided with a cam slot 144 through which there extends a lever 146 which is attached to the spindle 102. It will be evident that movement of the lever 146 in the slot 144 will cause the spindle 102 to be moved longitudinally of the sleeve 100. By properly positioning the sleeve 100 in the spindle mounting block 94 and locking the sleeve in that position by means of the screw 101, the engraving cutter 112 may be caused to engage the hemisphere when the lever 146 is rotated in a clockwise direction as viewed in Figure 9. A block 148 affixed to the upper surface of the spindle mounting block 94 mounts a set screw 150, the end of which provides a stop for the lever 146. By adjustment of the position of the end of the set screw 150, the depth of cut by the engraving cutter in the hemisphere can be adjusted.

A block 152 is affixed to the reduced diameter portion 153 of the left-hand end of the member 92 as viewed in Figure 1. Extending transversely of the block and affixed to the left-hand end thereof, as viewed in Figure 1, is a plate 154 which mounts a handle 156. The handle 156 provides a convenient grip whereby the apparatus may be moved over the surface of the bed plate 2 on the roller 122. A block 157 is affixed to the plate 154 and is provided with a horizontally extending bore within which is mounted a stylus 158. One end of a leaf spring 160 is affixed to the block 152. The other end of the leaf spring 160 is in engagement with the stylus 158 and urges the stylus toward the retainer 130.

The block 157 is also provided with a vertically extending bore through which there passes a shaft 162 which has affixed to its upper end a knurled knob 164. Affixed to the shaft 162 immediately above the block 157 is a clevis 166. The lower end of the shaft 162 extends below the block 157 and has affixed thereto a collar 168 in which there is mounted an outwardly extending pin 170. Affixed to the stylus 158 is a downwardly extending pin 172 which is adapted to be engaged by the pin 170 on the shaft 162 and to cause the stylus to move in a direction away from the retainer 130 against the urging of the spring 160 when the knob 164 is rotated in a counterclockwise direction.

A rod 174 is affixed to the spindle mounting block 94 and extends to the left therefrom, as viewed in Figures 1 and 2. A sleeve 176 is rotatably mounted over the rod 174. An angle-shaped strip of metal 178 has its lower end pivotally mounted on the rod 174. A link 180 has one of its ends pivotally connected to the clevis 166 and the other of its ends pivotally connected to the lower end of the angle 178 below the rod 174. Thus rotation of the shaft 162 will cause the angle 178 to rotate about the rod 174. The lower end of a generally upwardly extending rod 182 is affixed to the sleeve 176. One end of each of a pair of arms 184 is pivotally connected to the lever 146. Pivotally connected to and extending between the opposite ends of the pair of links 184 is a short bar 186. The bar 186 is provided with a transversely extending bore through which the rod 182 is adapted to slidably pass. A stop bracket 188 is affixed to the left-hand one of the pair of links 184 as viewed in Figure 1. A pin 190 is affixed to the angle 178 and is adapted to be engaged by the stop bracket 188 as will be hereinafter described. A spring 192 has its lower end mounted in the block 152 and its upper end formed to engage the pin 190 as will be hereinafter described.

Figure 5:
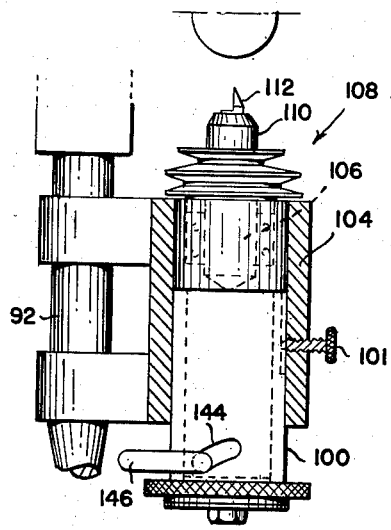
Figure 5 is a plan view partly in section of a fragmentary portion of the apparatus showing the engraving cutter in an inoperative position with respect to a hemisphere which is to be engraved.
Figure 8:
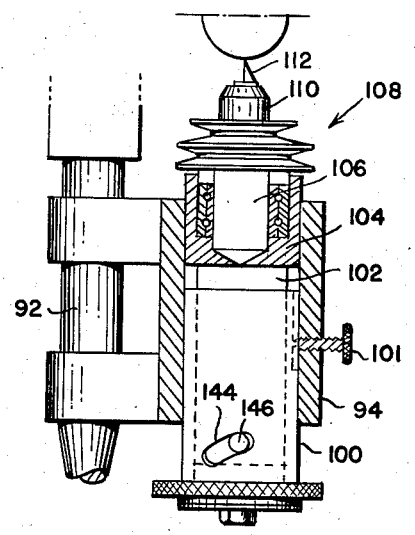
Figure 8 is a plan view partly in section of a fragmentary portion of the apparatus showing the engraving cutter in an operative position in engagement with a hemisphere to be engaged.
Figure 6:
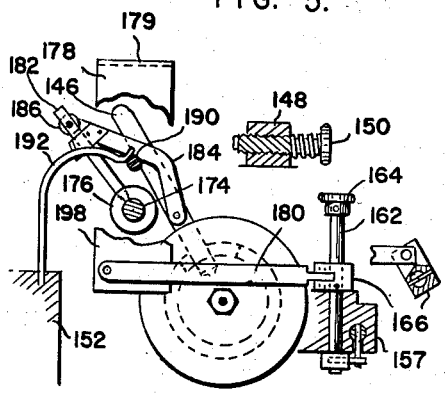
Figure 6 is an elevation partly in section of a fragmentary portion of the apparatus showing the lower end of the portion of the apparatus shown in Figure 5.
Figure 7:
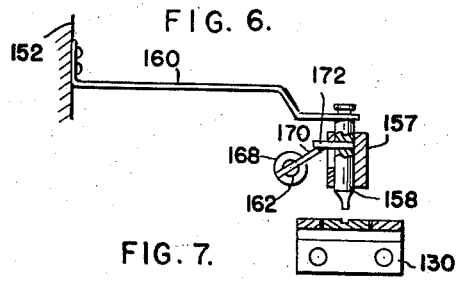
Figure 7 is a plan view partly in section of a fragmentary portion of the apparatus showing the engraving stylus in a retracted position with regard to a master engraved plate.
Figure 10:
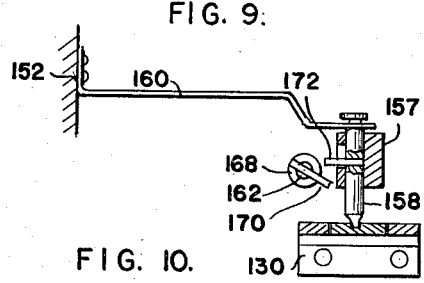
Figure 10 is a plan view partly in section of a fragmentary portion of the apparatus showing the engraving stylus in an operative position in engagement with a master engraved plate.

The operation of the apparatus may now be described. The operation can most easily be understood from the two positions of the machine shown diagrammatically in Figures 5, 6 and 7, and Figures 8, 9 and 10. In Figures 5, 6 and 7, the apparatus is shown in an at rest position in which the stylus is retracted from the master engraved plate, the engraving cutter is retracted from the hemisphere and the lever 146, by means of which the engraving cutter is retracted from or moved into engagement with the hemisphere, is positioned under the horizontally extending portion 179 of the angle member 178. The portion 179 of the angle 178 thus provides a cover or guard for the lever 146 and, before the lever is accessible, it is necessary that the stylus be moved into engagement with the master engraved plate by rotation of the knob 164 of the shaft 162. This rotation of the shaft 162 actuates the clevis 166 and the link 180 and moves the angle member 178 in a counterclockwise direction around the shaft 174 to the position shown in Figure 9.

When the parts are in the at rest position as shown in Figures 5-7, the pin 190, which is affixed to the angle plate 178, is in engagement with the upper end of the spring 192. This arrangement serves to hold the parts in the at rest position against the urging of the spring 160 acting on the stylus 158. When the stylus has been moved into engagement with the master plate, the angle 178 moves from the position shown in Figure 6 to that shown in Figure 9, and the pin 190 moves with it to the position shown at 190 in Figure 9.

Figure 9:
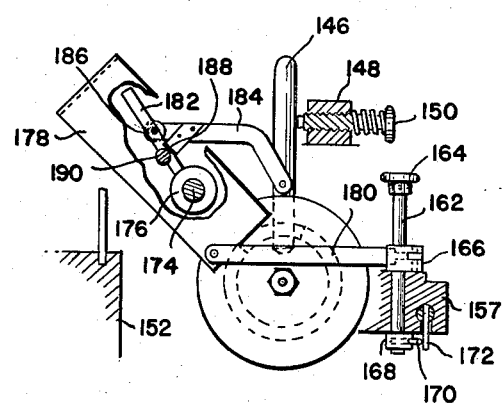
Figure 9 is an elevation partially in section showing the lower end portion of the apparatus shown in Figure 8.

With the lever 146 thus uncovered, the lever may be rotated in a clockwise direction from the position shown in Figure 6 to that shown in Figure 9 which will result in the movement of the engraving cutter 112 into engagement with the hemisphere to the extent provided by the adjustment of the set screw 150 as previously described.

As the lever 146 is moved to the right, as viewed in Figures 6 and 9, the links 184 move to the right and downwardly as the block 186 slides downwardly along the rod 182. When the parts have been moved to the operative position, as shown in Figure 9, the stop member 188 affixed to one of the arms 184 moves into engagement with the pin 190. This arrangement of parts prevents movement of the angle member 178 to the right, as viewed in Figure 9, so long as the engraving cutter is in engagement with the hemisphere and, thus, it is impossible to move lever 146 to retract the stylus 158 from the engraved plates while the engraving cutter 112 is in engagement with the hemisphere.

Before the stylus 158 can be retracted, it is necessary that the lever 146 retracting the engraving cutter 112 be rotated in a counterclockwise direction, as viewed in Figure 9, whereupon the stop member 188 is removed from its position adjacent to the pin 190. After the stop member 188 has been removed from its position adjacent to the pin 190, the shaft 164 may be rotated retracting the stylus 158 from the master engraved plate and rotating the angle guard 178 in a clockwise direction, as viewed in Figure 9, thus resulting in the parts assuming the positions shown in Figure 6. In this position, the lever 146 is guarded by the upper portion 179 of the angle member 178 preventing movement thereof until the stylus has been reengaged with an engraving plate. It will be evident that this arrangement provides a simple and effective guard against moving the engraving cutter improperly while it is in engagement with the hemisphere.

Figure 11:
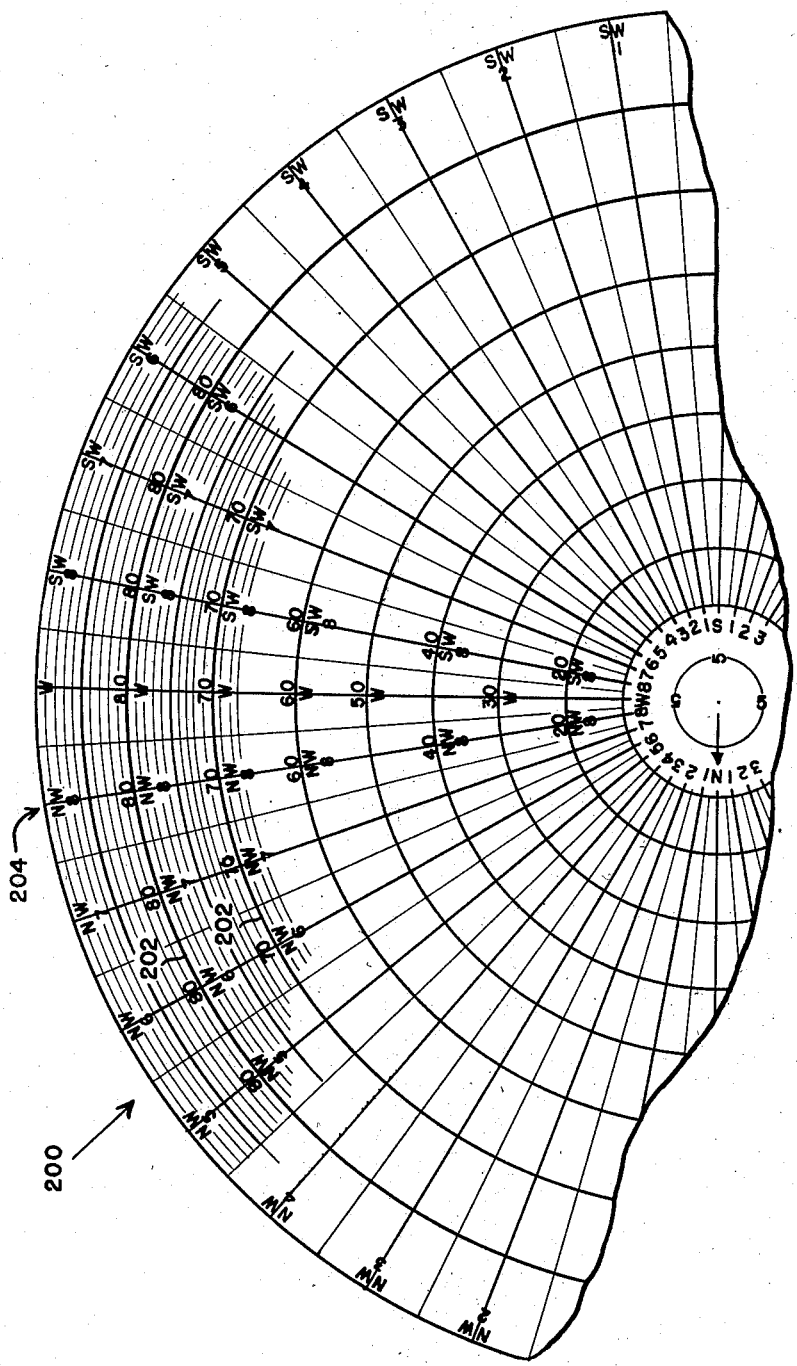
Figure 11 is a fragmentary showing of a greatly enlarged mirror image of an engraved hemisphere.

In Figure 11 there is shown generally at 200 a fragmentary portion of a mirror image of a plan development of the engraving produced upon a hemisphere. The engraving includes latitude circles 202 and longitude lines 204. When the apparatus is positioned as shown in Figure 1, the engraving cutter is at the fully retracted position. When latitude circles are cut in the hemisphere, the pin 124 is in engagement with the rod 120 and the roller 122 is supporting the engraving cutter assembly. By rotating the engraving cutter around the axis of the shaft 78 to successive positions as predetermined by center punch lines in plates mounted by retainers 30 variously positioned in the arcuate array of bores 128, the engraving cutter is positioned on the hemisphere at various latitudes thereon. If the disc 22 is rotated by means of the hand wheel 32 while the engraving cutter is held stationary at each latitude position, it will be evident that latitude circles will be cut at each of those latitudes. As indicated in Figure 11, these circles may be engraved at 1° intervals if desired.

If all of the retainers are removed from the bed plate and the pin 124 is in position holding the shaft 120 in fixed position within the member 118, thus providing a fixed support for the engraving assembly on the roller 122, and if with the parts in this position the engraving assembly is rotated around the axis of the shaft 78 with the engraving assembly carried on the roller 122 while the hemisphere is held stationary, a longitude line will be cut in the hemisphere. The annular array of recesses 24 provided in the disc 22 and the arrangement of the pins 52 and 54, previously described, provide indexing means whereby the hemisphere may be held in fixed successive 5° spaced positions and, if at each of these positions a longitude line is cut, it will, of course, be evident that the result will be 5° spaced longitude lines.

By substituting for the single engraved plate containing the center punches in each of the retainers 130 a set of plates, such as the plates 132, 134 and 136 shown in Figure 3 bearing the indications shown on the latitude line indicated generally at 204 in Figure 11, and then by positioning the disc 22 so that the indication NW8 appears adjacent to the index plate 68 and entering the pin 52 into its adjacent recess in order to lock the disc 22 in position, these indicia may be successively engraved on the hemisphere by tracing the stylus 158 over the master engraved plates. When the desired indicia has been engraved along one longitude line, the master plates in the retainers will be replaced by the master plates providing for the engraving of the indicia along a next longitude line and the disc 22 rotated in order to position the hemisphere for engraving along that longitude line. During the engraving of this indicia, the pin 124 will be removed from the rod 120 in order to permit free vertical motion of the engraving assembly. A spring loading arrangement may be provided between the rod 120 and the extension 118 through which it passes in order to provide a yielding support for at least some of the weight of the engraving assembly when the pin 124 is removed from the rod 120.

It will be evident that the apparatus described provides for the engraving of longitude and latitude lines as well as compass bearing indicia on the surface of a hemisphere with a high degree of accuracy. The invention has been described with regard to the use of an engraving cutter which would serve to engrave or cut recesses in the hemisphere. It will be evident, however, that the engraving cutter 112 may be replaced by any suitable means for providing a marking on the hemisphere. The word "engraving" as used herein and as employed in the following claims should not be construed as limiting the invention to an engraving cutter but should be construed as referring to any suitable means for marking indicia on the hemisphere. It will be evident that this and other modifications may be made to the embodiment of the invention described herein without departing from the scope of the invention as set forth in the following claims.

What is claimed is:

1. Engraving apparatus comprising means for mounting an article having a spherical surface to be engraved, means for rotating the article on its polar axis, means for indexing increments of rotation of the article on its polar axis, engraving means, means mounting said engraving means for movement in mutually perpendicular directions about a center coincident with the center of radius of the spherical surface of the article to be engraved, means for mounting an arcuate array of members bearing indicia, the center of radius of the arcuate array being coincident with the center of radius of the spherical surface of the article to be engraved, means for tracing the indicia on said members, and means for connecting said tracing means and said engraving means mounting means for producing relative motion of said engraving means as said tracing means is traced over the indicia on said members for engraving indicia along longitude lines on the spherical surface of the article at successive indexed positions of the article.

2. Engraving apparatus comprising means for mounting an article having a spherical surface to be engraved, means for rotating the article on its polar axis, means for indexing increments of rotation of the article on its polar axis, means for releasably securing the article in an indexed position, engraving means, means mounting said engraving means for movement longitudinally over the surface of the article on lines extending through the pole thereof to inscribe longitude lines on the article while the article is held stationary in indexed positions of rotation of the article on its polar axis.

3. Engraving apparatus comprising means for mounting an article having a spherical surface to be engraved, rotatable engraving means, means for rotating said engraving means, means mounting said engraving means and said rotating means for simultaneous movement in mutually perpendicular directions about a center coincident with the center of radius of the spherical surface of the article to be engraved, means for mounting an arcuate array of members bearing indicia, the center of radius of the arcuate array being coincident with the center of radius of the spherical surface of the article to be engraved, means for tracing the indicia on said members, and means for connecting said tracing means and said engraving means mounting means for producing relative motion of said engraving means over the spherical surface of the article as said tracing means is traced over the indicia on said members.

4. Engraving apparatus comprising means for mounting an article having a spherical surface to be engraved, means for rotating the article on its polar axis, means for indexing increments of rotation of the article on its polar axis, engraving means, means mounting said engraving means for movement in coordinate directions over the spherical surface of the article, means mounting an arcuate array of individual replaceable members bearings indicia, means for tracing the indicia on each of said members, and means for connecting said tracing means and said engraving means mounting means for producing relative motion of said engraving means over the spherical surface of the article as said tracing means is traced over the indicia on each of said members.

5. Engraving apparatus comprising means for mounting an article to be engraved, engraving means, means mounting said engraving means for movement over the surface of the article, means mounting a member bearing indicia, means for tracing the indicia on said member, means for connecting said tracing means and said engraving means mounting means for producing relative motion of said engraving means as said tracing means is traced over the indicia on said member, means for manually moving said engraving means into and out of engagement with said article, means for manually moving said tracing means into and out of engagement with said indicia bearing member, and mechanical interlock means preventing operation of said means for manually moving said engraving means into engagement with said article when the tracing means is positioned out of engagement with said indicia bearing member.

6. Engraving apparatus comprising means for mounting an article to be engraved, engraving means, means mounting said engraving means for movement over the surface of the article, means mounting a member bearing indicia, means for tracing the indicia on said member, means for connecting said tracing means and said engraving means mounting means for producing relative motion of said engraving means as said tracing means is traced over the indicia on said member, means for manually moving said engraving means into and out of engagement with said article, means for manually moving said tracing means into and out of engagement with said indicia bearing member, and mechanical interlock means preventing operation of said means for manually moving said tracing means out of engagement with said indicia bearing means when said engraving means is in engagement with the article.

References Cited in the file of this patent

UNITED STATES PATENTS

| | | |
|---|---|---|
| 460,168 | Van Houten | Sept. 29, 1891 |
| 481,893 | Bryce | Aug. 30, 1892 |
| 1,625,062 | Turner | Apr. 19, 1927 |
| 1,627,205 | Seaborne | May 3, 1927 |
| 1,665,321 | Parker | Apr. 10, 1928 |
| 2,058,395 | Atti | Oct. 27, 1936 |
| 2,627,658 | Green | Feb. 10, 1953 |
| 2,666,989 | Gunderson | Jan. 26, 1954 |
| 2,678,497 | Dodson | May 18, 1954 |
| 2,721,503 | Atti | Oct. 25, 1955 |
| 2,748,664 | Colombo | June 5, 1956 |
| 2,767,622 | Whittard | Oct. 23, 1956 |

FOREIGN PATENTS

| | | |
|---|---|---|
| 135,675 | Great Britain | Dec. 4, 1919 |